Dec. 16, 1924.

E. A. RUSSELL

Re. 15,965

VALVE

Original Filed Dec. 31, 1920 3 Sheets-Sheet 1

Inventor

Edward A. Russell

By Barnett & Fitzpatrick

Attorneys

Dec. 16, 1924.

Re. 15,965

E. A. RUSSELL

VALVE

Original Filed Dec. 31, 1920 3 Sheets-Sheet 2

Inventor

Edward A. Russell

By Burnett & Truman

Attorneys

Dec. 16, 1924.

Re. 15,965

E. A. RUSSELL

VALVE

Original Filed Dec. 31, 1920 3 Sheets-Sheet 3

Inventor

Edward A. Russell

By Barnes & Thurman

Attorneys

Reissued Dec. 16, 1924. Re. 15,965

UNITED STATES PATENT OFFICE.

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK.

VALVE.

Original application filed December 31, 1920, Serial No. 434,179. Divided and this application filed August 13, 1921, Serial No. 492,207. Original No. 1,442,973, dated January 23, 1923. Application for reissue filed May 12, 1923. Serial No. 638,682.

*To all whom it may concern:*

Be it known that I, EDWARD A. RUSSELL, a citizen of the United States, and a resident of Chicago, in the county of Cook and State of Illinois, have made certain new and useful Improvements in Valves, of which the following is a specification.

My invention relates to a multiple port valve device or circulation controller of the rotary type for governing the circulation of fluid through a pipe system; this application being a division of my co-pending application Serial No. 434,179, filed December 31, 1920, for automatic car heating systems, in which the valve device is employed to automatically control the inflow of steam to and the discharge of medium, including water of condensation, from the radiating coil of the car heating apparatus.

A principal object of the invention is to provide a new and improved valve device, or circulation controller of this character suitable for use in the above mentioned or analogous situations. A particular object is to so construct the device that water of condensation may be discharged therethrough from an intermediate point in the radiating coil as well as from the discharge end of the coil, while the device is set for admitting steam to such coil.

A further object of the invention is to provide a novel and improved electrically actuated mechanism for shifting the valve from one position to the other.

A further object is to provide for hand operation of the valve in case the electric apparatus is accidentally or intentionally disabled.

A further object is to provide an actuating means for the valve which will be compact, positive and reliable in its action, simple in construction and economical to manufacture and install.

The invention consists in the new and improved arrangements, constructions and devices to be hereinafter described and claimed for carrying out the above stated objects and such other incidental objects as will be mentioned in the description that follows of the preferred embodiment of the invention shown in the accompanying drawings.

Figure 1:
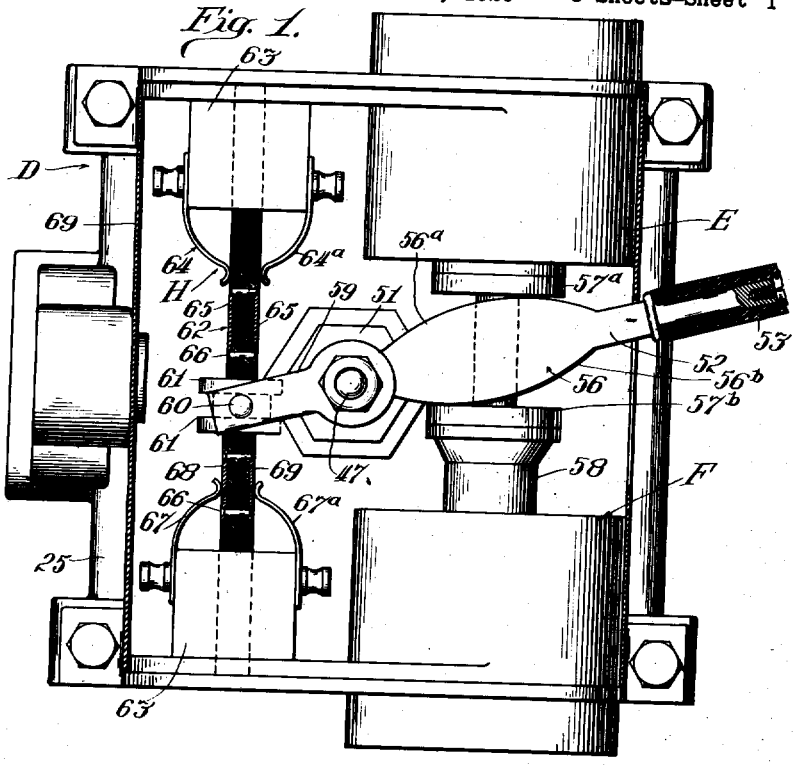
Fig. 1 is a plan view of the valve device, with certain parts shown in section.
Figure 2:
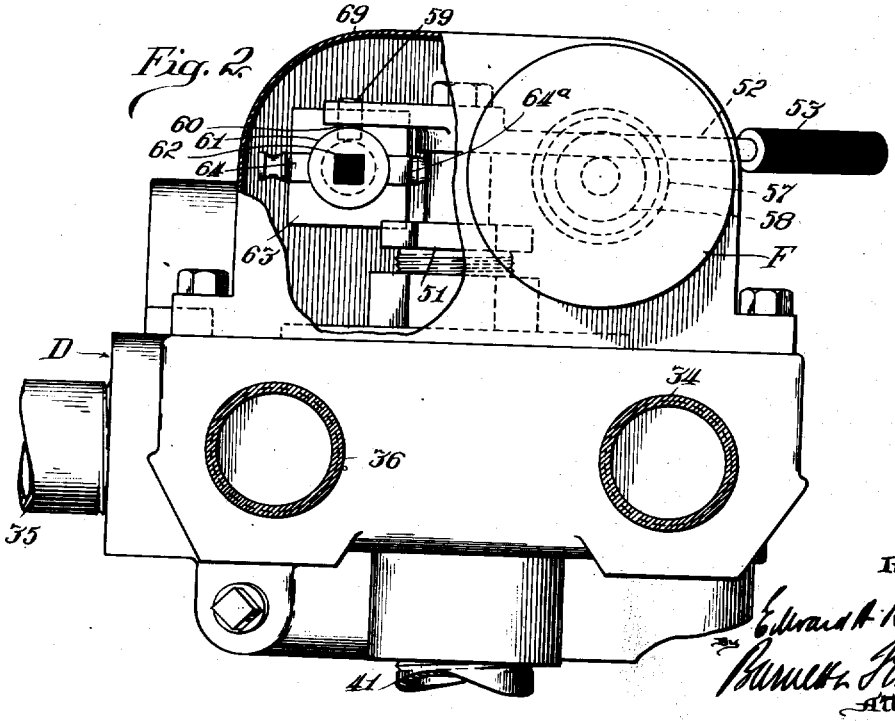
Fig. 2 is a side elevation thereof with a portion of the hood broken away to show the interior mechanism.
Figure 3:
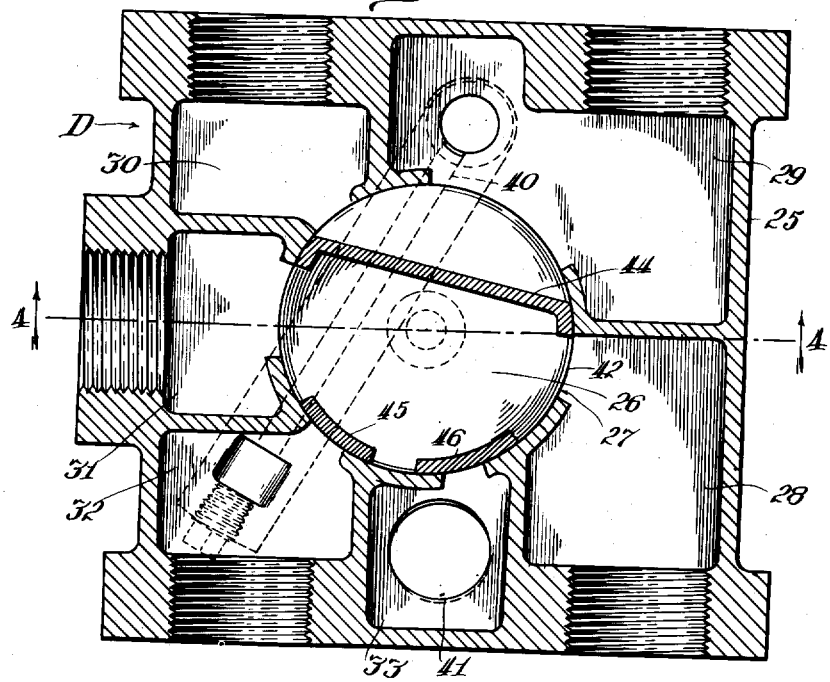
Fig. 3 is a sectional plan.
Figure 4:
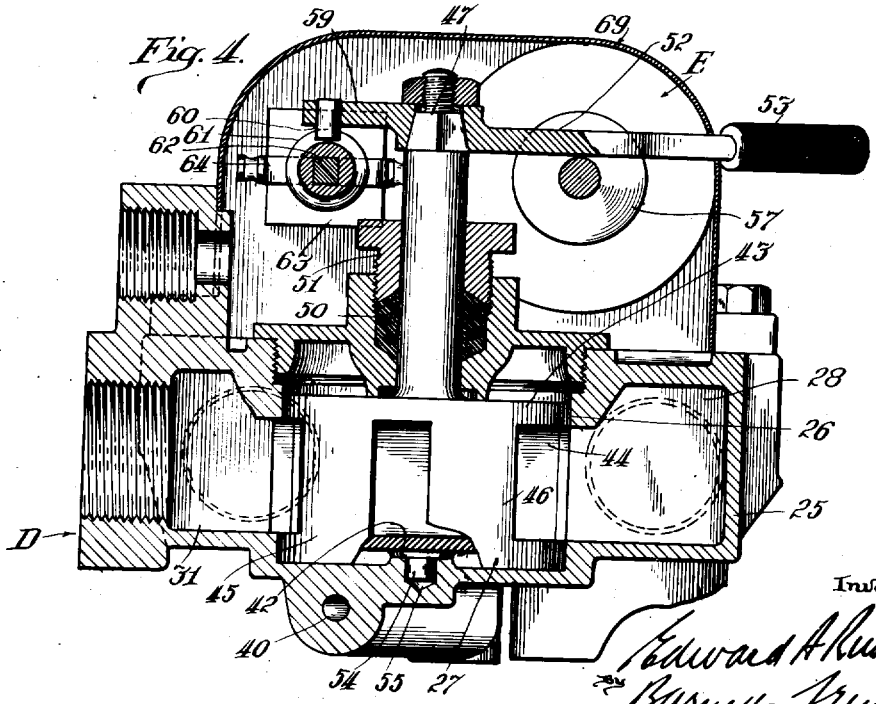
Fig. 4 is a vertical sectional view on line 4—4 of Fig. 3.
Figure 5:
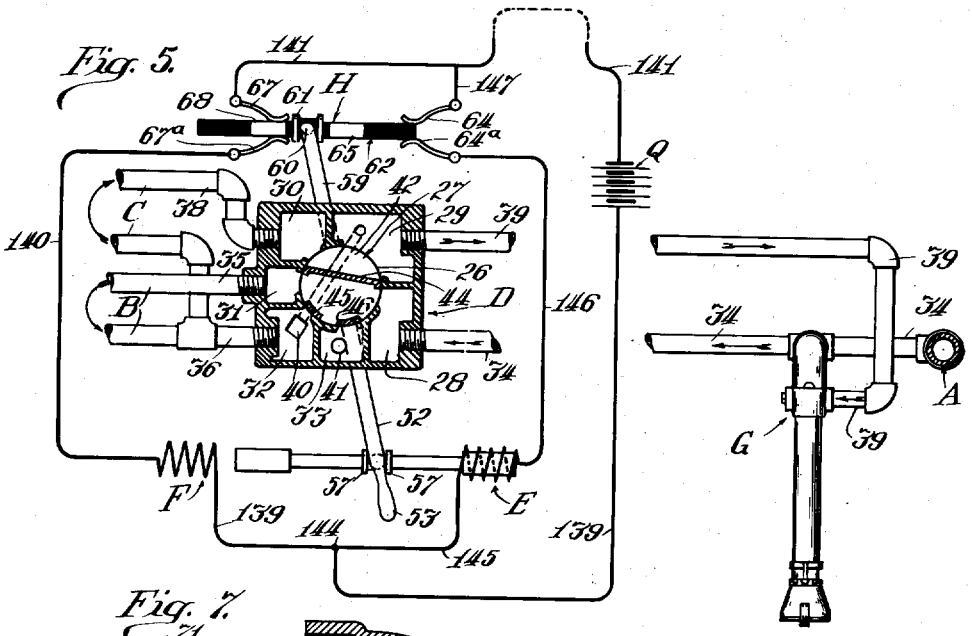
Fig. 5 is a diagrammatic view to illustrate the operation of the device, the valve being shown in the open position.
Figure 7:
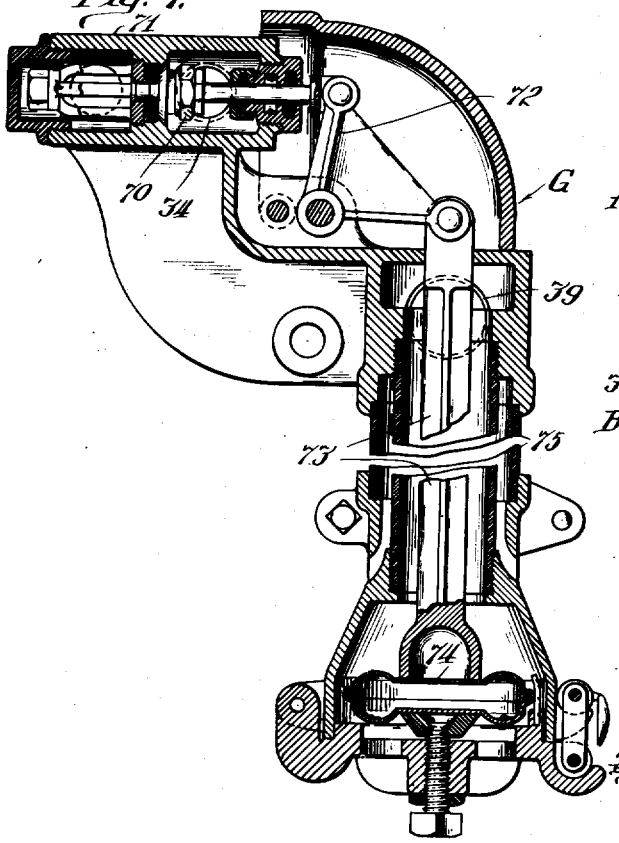
Fig. 7 is a sectional view of the vapor regulator shown in Fig. 5.
Figure 6:
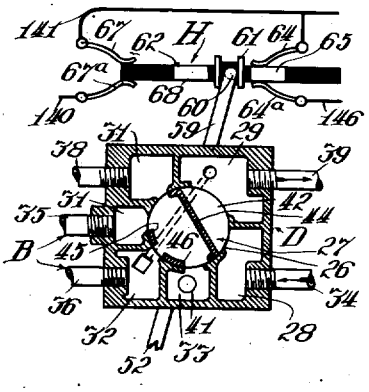
Fig. 6 is a fragmentary diagram showing the valve in the closed position.

Referring first to Figs. 5 and 6, A is the steam train pipe of a railway car, the radiating coil of which is shown as consisting of two sections B and C. D is the circulation controller of the radiator, E and F the motors operating the same, G the vapor regulator, H the limit switch for switching the current alternately to motors E and F, and Q the battery for supplying electric current.

The circulation controller or valve device is preferably constructed as shown in Figs. 1, 2, 3 and 4. 25 is a casing divided by interior webs into a central circular space 26, in which is arranged a rotary valve 27, and around said circular space into a plurality of chambers which for convenient reference will be given the following somewhat arbitrary designations and are numbered on the drawings as follows: 28 is a supply chamber connected by pipe 34 with the train line A; 29 is a discharge chamber connected by pipe 39 with the thermostat chamber of the vapor regulator G; 31 is an inlet chamber from which leads the inlet pipe 35 of radiator section B; 32 is a first return chamber to which extends a drain pipe 36 from the return end of radiator section B; 30 is a second return chamber to which leads the return end 38 of radiator section C; and 33 is a drip chamber having a port communicating with a drip pipe 41.

The first return chamber 32 is connected with the discharge chamber 29 by a duct 40 formed in the casing under the above mentioned chambers. This duct might extend to the second return chamber 30 instead of to discharge chamber 29 since, as will appear, chambers 29 and 30 communicate with each other at such times as the duct 40 is necessary for the proper operation of the controller. This duct is arranged so as to be water sealed against the escape of steam.

The valve 27 comprises a lower disc 42, an upper disc 43 and webs 44, 45 and 46, the upper disc being formed with a stem 47 extending through a bonnet 48 on the top of casing 25 and through a packing 50 and packing gland 51. The stem 47 has fixed thereto a lever 52 terminating, preferably, in a handle 53. 54 is a pivot stud on the lower disc 42 which fits a recess 55 in the bottom of the casing. The lever 52 is formed with a widened portion 56 having curved edges 56ᵃ, 56ᵇ and this portion of the lever is engaged by a pair of heads 57ᵃ, 57ᵇ formed on the unitary structure 58 forming the cores of the solenoid motors E and F. The opposite end 59 of lever 53 is provided with a depending stud 60 engaging a collar 61 on the switch member 62 of limit switch H. This switch member is composed of insulating material and slides in suitable openings in block 63. A pair of spring contacts 64, 64ᵃ secured to one of the blocks 63 are adapted to bear against the contact plates 65, 65 on member 62, these plates being electrically connected by rivets 66. Secured to the other block 63 is a similar pair of contact springs 67, 67ᵃ adapted to engage the contact plates 68 on the corresponding end of member 62. The arrangement is such that when the contact springs 67, 67ᵃ bear against the plates 68, 68, the contact plates 65 are out of touch with springs 64, 64ᵃ, and vice versa. 69 is a hood on the top of casing 25 enclosing the inner ends of the solenoids and the limit switch.

The vapor regulator G is a device in common use for maintaining the steam in the radiator at substantially atmospheric pressure. For details of construction reference is made to the patent to Gold 1,077,525, Nov. 4, 1913. In the present connection it will be sufficient to state that the device comprises a pressure reducing valve 70 arranged in a valve casing 71 which is interposed in the supply pipe 34. Valve 70 is operated by a bell crank 72 to which is attached a stem 73 bearing upon a flexible capsule 74 filled with a liquid which expands under heat. This capsule or thermostat is arranged in a thermostat chamber 75 to which discharge pipe 39 leads. Outflow of live steam through pipe 39 expands thermostat 74, throttling down valve 70 to limit inflow to the radiator.

*Operation.*—Fig. 5 shows the position of the parts of the apparatus at such time as the radiating coil is receiving steam from train pipe A. Steam flows through pipe 34 past valve 70 of the vapor regulator which automatically governs the volume of steam introduced into the radiator in accordance with the amount required to keep the same filled (assuming valve D is in the open position) at atmospheric pressure. From pipe 34 steam passes through chambers 28, 31, pipe 35 of coil B, through radiator section B into pipe 37 of radiator section C and through radiator section C. The water of condensation outflows from radiator section B through pipe 36, first return chamber 32, duct 40, discharge chamber 29 and pipe 39 to the thermostat chamber 75 of the vapor regulator G. Duct 40 is sealed against the escape this way of steam. Water of condensation (and steam in certain quantities when the system is working at capacity) outflows from radiator section C through pipe 38, second return chamber 30, discharge chamber 29 and pipe 39. When the car temperature has reached a certain point valve member 27 is rotated by motor F through the operation of certain thermostatically actuated controlling devices which are shown in my co-pending application Serial No. 434,179 above referred to but which form no part of the present invention. These devices serve, when actuated, to close a circuit through motor F as follows: battery Q, wire 139, winding of solenoid F, wire 140, contact spring 67ᵃ, contact plate 68, contact spring 67, wire 141 to the battery; the thermostatically actuated controlling devices being connected with the wire 141 at the place, for example, indicated by the broken lines. So far as the present invention is concerned, any suitable means might be employed for closing the circuit at this place.

The valve 27 and limit switch H are now moved to the position shown in Fig. 6. Web 44 shuts off the supply chamber 28 from all of the other chambers except the discharge chamber 29. Webs 45 and 46 are moved so that the other chambers are all in communication with the drip chamber 33. Steam now flows from pipe 34 directly to pipe 39, and, by operation of the pressure reducing valve 70 of the vapor regulator just enough steam follows this course to keep the vapor regulator warm as against freezing, without wastage. Water of condensation from the inlet pipe 35 and from the return pipes 36, 38 outflows through the drip pipe 41. Duct 40 is water sealed so that with the low pressure of steam handled there is no backing up of steam from the discharge chamber 29 into the radiator.

When the thermostatic controlling devices (or equivalent circuit controlling means) operate to again close the break in conductor 141, which in the arrangement shown will be on fall of the car temperature to a certain point, motor E is energized to return the valve to the position of Fig. 5 by the closing of a circuit as follows: battery Q, wire 139, wire 145, winding of solenoid E, wire 146, spring contact 64[a], contact plates 65, spring contact 64, wire 147, wire 141, to battery.

The limit switch, it will be observed, is moved by the valve itself so as to alternately direct the current to the motor operating solenoids E and F.

The expedient of forming the portion of lever 52 engaged by heads 57 with a widened portion having curved edges, as described above, has the advantage of utilizing most effectively the force developed by the solenoids E and F for moving the revoluble member of the valve and the reciprocating member of the limit switch without sacrificing compactness and simplicity of structure. The arrangement is such that the leverage of the solenoid coil structure on the parts moved is at a miximum during the beginning of each angular movement of the lever, at which time the pull of the solenoid is necessarily weakest and the resistance to be overcome, due to inertia and friction of the moved parts the greatest, this initial leverage being gradually decreased as the movement of the lever progresses. This will be apparent from consideration of Fig. 1. Assuming that solenoid F is energized so as to draw the core structure in this direction, the initial engagement of head 57[a] with the curved edge 56[a] of the lever is at a point on the other side of the axis of the solenoid core from the axis of rotation of the valve, the pivotal axis, that is, of the lever. The force which the solenoid exerts upon the valve and limit switch is, therefore, considerably greater than if the point of engagement between the lever and the core were at the axis of the core. After the inertia of the initial friction of the parts has been overcome and the movement of the lever progresses, the point of bearing of head 57 on the lever shifts inwardly toward the axis of rotation of the lever, the leverage being consequently diminished and the lever finally brought to a position where the head 57[b] is ready to engage the edge 56[b] of the lever at a point of maximum remoteness from the axis of rotation of the lever. The result of this arrangement is that the valve operating mechanism may be made relatively small and compact and a smooth, even movement of the actuated parts is obtained. A relatively short lever may be employed, relatively small coils may be used and the electro-motive forces required reduced to a minimum.

The valve 27 has been referred to as being in the "open" position when turned to admit steam to the radiator and direct outflowing medium to the thermostat chamber of the vapor regulator as shown in Fig. 5. By referring to the valve as in the "closed" position (these terms being necessarily somewhat arbitrary in a valve device of this sort) I intend the position of the valve as shown in Fig. 6 in which the steam is short circuited to the vapor regulator. These terms may have to be construed in a relative rather than in an absolute sense in case, as is within the scope of the present invention, the controller is put to a use different from that hereinabove described.

I claim:

1. A valve device comprising a casing having a central valve chamber 26 and chambers 28, 29, 30, 31, 32 and 33, a duct connecting chambers 32 and 29, a drain pipe leading from chamber 33 and a rotary valve in chamber 26 which in one position puts chambers 28 and 29 in communication with each other, shuts off these chambers from the others, and puts the others in communication with each other, and in another position puts chambers 28 and 31 in communication with each other, chambers 29 and 30 in communication with each other, and shuts off chambers 32 and 33.

2. In a circulation controlling device, the combination of a valve casing provided with a supply chamber, a discharge chamber, an inlet chamber, a first and second return chamber, a drip chamber and a duct, arranged so as to be water sealed, leading from the first return chamber to the discharge chamber; and a rotary valve which in one position establishes communication between the supply and inlet chambers and between the return and discharge chambers, and in another position establishes communication between the supply and discharge chambers and between the second return chamber and the drip chamber, shutting off the inlet chamber from the supply chamber.

3. In a circulation controlling device, the combination of a valve casing provided with a supply chamber, a discharge chamber, an inlet chamber, a first and a second return chamber, a drip chamber, and a duct leading from the first return chamber to the discharge chamber; and a rotary valve which in one position establishes communication between the supply and inlet chambers and between the return and discharge chambers, shutting off the return and drip chambers from the supply chamber, and in another position establishes communication between the supply and discharge chambers and between the second return chamber and the drip chamber, shutting off the inlet chamber from the supply chamber.

4. In a circulation controlling device, the combination of a valve casing provided with a supply chamber, a discharge chamber, an inlet chamber, a first and a second return chamber, a drip chamber and a duct leading from the first return chamber to the discharge chamber; and a rotary valve which in one position establishes communication between the supply and the inlet chambers and between the return and discharge chambers, and in another position establishes communication between the supply and discharge chambers and between the return chambers and the drip chamber shutting off the inlet chamber from the supply chamber.

5. In a circulation controlling device, the combination of a valve casing provided with a supply chamber, a discharge chamber, an inlet chamber, a first and a second return chamber, a drip chamber and a duct leading from the first return chamber to the discharge chamber; and a rotary valve which in one position establishes communication between the supply and the inlet chambers and between the return and discharge chambers and in another position establishes communication between the supply and discharge chambers and between the return and inlet chambers and the drip chamber, shutting off the inlet chamber from the supply chamber.

6. In a circulation controlling device, the combination of a valve casing provided with a supply chamber, a discharge chamber, an inlet chamber, a first and a second return chamber, a drip chamber and a duct leading from the first return chamber to the discharge chamber; and a rotary valve which in one position establishes communication between the supply and inlet chambers and between the return and discharge chambers, shutting off the return and drip chambers from the supply chamber, and in another position establishes communication between the supply and discharge chambers and between the return chambers and the drip chamber, shutting off the inlet chamber from the supply chamber.

7. In a circulation controlling device, the combination of a valve casing provided with a supply chamber, a discharge chamber, an inlet chamber, a first and a second return chamber, a drip chamber and a duct leading from the first return chamber to the discharge chamber; and a rotary valve which in one position establishes communication between the supply and inlet chambers and between the return and discharge chambers, shutting off the return and drip chambers from the supply chamber, and in another position establishes communication between the supply and discharge chambers and between the return and inlet chambers and the drip chamber, shutting off the inlet chamber from the supply chamber.

8. In a circulation controlling device, the combination of a valve casing provided with a supply chamber, a discharge chamber, an inlet chamber, a first and a second return chamber and a drip chamber; a rotary valve which in one position establishes communication between the supply and inlet chambers and between the return and discharge chambers and in another position establishes communication between the supply and discharge chambers and between the second return chamber and the drip chamber, shutting off the inlet chamber from the supply chamber; said device being formed with a duct which leads from the first return chamber to a part of the valve casing in communication with the discharge chamber when the valve is in its first named position.

9. In a circulation controlling device, the combination of a valve casing provided with a supply chamber, a discharge chamber, an inlet chamber, a first and a second return chamber and a drip chamber; a rotary valve which in one position establishes communication between the supply and inlet chambers and between the return and discharge chambers, and in another position establishes communication between the supply and discharge chambers and between the second return chamber and the drip chamber, shutting off the inlet chamber from the supply chamber; said device being formed with a water sealed duct which leads from the first return chamber to a part of the valve casing in communication with the discharge chamber when the valve is in its first named position.

10. In a circulation controlling device, the combination of a valve casing provided with a supply chamber, a discharge chamber, an inlet chamber, a first and a second return chamber, and a drip chamber; and a rotary valve which in one position establishes communication between the supply and inlet chambers and between the return and discharge chambers, shutting off the return and drip chambers from the supply chamber, and in another position establishes communication between the supply and discharge chambers and between the return chambers and the drip chamber, shutting off the inlet chamber from the supply chamber; said device being formed with a duct which leads from the first return chamber to a part of the valve casing in communication with the discharge chamber when the valve is in its first named position.

11. In a circulation controlling device, the combination of a valve casing formed with a centrally arranged circular space and around the same with a supply chamber, a drip chamber, a first return chamber, an inlet chamber, a second return chamber, and a discharge chamber, all opening into said space; and a revoluble valve in said circular space comprising webs which in the open position of the valve block off from the supply chamber all the other chambers except the inlet chamber, the return chambers being in such case in communication with the discharge chamber, and which in the closed position of the valve block off from the supply chamber all the chambers except the discharge chamber, putting the other chambers in communication with the drip chamber.

12. In a circulation controlling device, the combination of a valve casing formed with a centrally arranged circular space and around the same with a supply chamber, a drip chamber, a first return chamber, an inlet chamber, a second return chamber, and a discharge chamber, all opening into said space; and a revoluble valve in said circular space comprising webs which in the open position of the valve block off from the supply chamber all the other chambers except the inlet chamber, the return chambers being in such case in communication with the discharge chamber, and which in the closed position of the valve block off from the supply chamber all the chambers except the discharge chamber, putting the other chambers in communication with the drip chamber; said device being formed with a duct which leads from the first return chamber to a part of the valve casing in communication with the discharge chamber when the valve is in its first named position.

13. In a circulation controlling device, the combination of a valve casing formed with a centrally arranged circular space and around the same with a supply chamber, a drip chamber, a first return chamber, an inlet chamber, a second return chamber, and a discharge chamber, all opening into said space; and a revoluble valve in said circular space comprising webs which in the open position of the valve block off from the supply chamber all the other chambers except the inlet chamber, the return chambers being in such case in communication with the discharge chamber, and which in the closed position of the valve block off from the supply chamber all the chambers except the discharge chamber, putting the other chambers in communication with the drip chamber; said device being formed with a water sealed duct which leads from the first return chamber to a part of the valve casing in communication with the discharge chamber when the valve is in its first named position.

14. In a circulation controlling device, the combination of a valve casing formed with a centrally arranged circulation space and around the same with a supply chamber, a drip chamber, a first return chamber, an inlet chamber, a second return chamber, and a discharge chamber, all opening into said space, and a revoluble valve in said circulation space comprising upper and lower discs and webs which latter, in the open position of the valve, block off from the supply chamber all of the other chambers except the inlet chamber, the return chambers being in such case in communication with the discharge chamber and which, in the closed position of the valve, block off from the supply chamber all the chambers except the discharge chamber, putting the other chambers in communication with the drip chamber; a stem formed on said upper disc, and a lever on said stem.

15. In a circulation controlling device, the combination of a valve casing formed with a centrally arranged circular space and around the same with a supply chamber, a drip chamber, a first return chamber, an inlet chamber, a second return chamber and a discharge chamber, all opening into said space and a revoluble valve in said circular space comprising webs which in the open position of the valve block off from the supply chamber all the other chambers except the inlet chamber, the return chambers being in such case in communication with the discharge chamber, and which in the closed position of the valve block off from the supply chamber all the chambers except the discharge chamber, putting the other chambers in communication with the drip chamber, and a pair of electric motors mounted on said casing to move said valve in opposite directions.

16. In a circulation controlling device, the combination of a valve casing formed with a centrally arranged circular space and around the same with a supply chamber, a drip chamber, a first return chamber, an inlet chamber, a second return chamber and a discharge chamber, all opening into said space, a revoluble valve in said circular space comprising webs which in the open position of the valve block off from the supply chamber all the other chambers except the inlet chamber, the return chambers being in such case in communication with the discharge chamber, and which in the closed position of the valve block off from the supply chamber all the chambers except the discharge chamber, putting the other chambers in communication with the drip chamber, a pair of electric motors mounted on said casing to move said valve in opposite directions, and a limit switch moved by said valve for directing the current alternately to said motors.

17. In a circulation controlling device, the combination of a valve casing formed with a plurality of chambers having ports, a rotary valve to control communication between said chambers, a stem on said valve, a lever on said stem, a pair of solenoids having cores forming a unitary structure and provided with spaced heads, said lever being formed with a rounded portion which is engaged between said heads, and a limit switch comprising a longitudinally removable bar slidably mounted on said casing and engaged by the other end of said lever.

18. In a circulation controlling device, the combination of a valve casing provided with a central circulation space and with chambers arranged around said space, a valve in said circular space comprising upper and lower discs and vertical webs for controlling the communication between said chambers, an upwardly extending stem on said valve, a lever on said stem, a pair of solenoids arranged on the top of the casing and having cores forming a unitary structure engaged by said lever, a limit switch comprising oppositely arranged pairs of contact springs, and a switch member provided with contact plates and having a collar engaged by said lever.

19. In combination with a valve having a revoluble member provided with an operating lever having arms extending on opposite sides of the pivotal axis of the valve, a reciprocating switch member on one side of the valve axis to which one of said arms is operatively connected, a pair of solenoids on the other side of said axis having cores forming a unitary structure, and a pair of spaced heads on said core structure between which the other lever arm extends, said last named arm and the heads being formed so that the head remote from the energized solenoid, in each case, during the movement of the core toward such solenoid, has a bearing on said lever which shifts, as said movement progresses, toward the pivotal axis of the lever.

20. In combination with a valve having a revoluble member; a pair of solenoids adapted for alternate energization and having a unitary core structure provided with spaced heads; and an operating lever connected with said revoluble member and extending between said heads, obliquely to the length of the core when the revoluble member of the valve is in either extreme position, the portion of which lever lying between said heads is formed with outwardly curved edges in contact with the heads respectively, whereby the leverage on the revoluble member is greatest at the beginning of each of the reciprocating movements of the core.

21. In combination with a valve having a movable member, and means for imparting movement to said valve alternately in opposite directions, comprising a pair of solenoids adapted for alternate energization and having a unitary core structure provided with spaced heads, and a lever operatively connected with said valve member and extending between said heads, obliquely to the length of the solenoid core when the valve member is in either extreme position, the portion of which lever lying between said heads is formed with outwardly curved edges in contact with the heads, respectively, whereby the leverage of the movable member of the valve is greatest at the beginning of each of the movments of the core.

EDWARD A. RUSSELL.